US012584235B2

(12) United States Patent (10) Patent No.: US 12,584,235 B2
Skalsky (45) Date of Patent: Mar. 24, 2026

(54) METHOD FOR SURFACE TREATMENT

(71) Applicant: PROVEXA TECHNOLOGY AB, Gothenburg (SE)

(72) Inventor: Anders Skalsky, Gothenburg (SE)

(73) Assignee: PROVEXA TECHNOLOGY AB, Gothenburg (SE)

( * ) Notice: Subject to any disclaimer, the term of this patent is extended or adjusted under 35 U.S.C. 154(b) by 947 days.

(21) Appl. No.: 17/047,450

(22) PCT Filed: Mar. 13, 2019

(86) PCT No.: PCT/SE2019/050224
§ 371 (c)(1),
(2) Date: Oct. 14, 2020

(87) PCT Pub. No.: WO2019/203709
PCT Pub. Date: Oct. 24, 2019

(65) Prior Publication Data
US 2021/0115585 A1 Apr. 22, 2021

(30) Foreign Application Priority Data
Apr. 19, 2018 (SE) .................................... 1850456-3

(51) Int. Cl.
*C25D 15/02* (2006.01)
*C09D 5/08* (2006.01)
(Continued)

(52) U.S. Cl.
CPC ............. *C25D 15/02* (2013.01); *C09D 5/084* (2013.01); *C09D 5/4407* (2013.01); *C09D 5/448* (2013.01);
(Continued)

(58) Field of Classification Search
CPC ........ C25D 15/02; C25D 15/00; C25D 13/01; C09D 5/084; C09D 5/4407; C09D 5/448;
(Continued)

(56) References Cited

U.S. PATENT DOCUMENTS 4,882,090 A 11/1989 Batzill et al.
5,378,335 A 1/1995 Hoppe-Höffler et al.
(Continued)

FOREIGN PATENT DOCUMENTS

CA 3035760 A1 3/2018
CN 103966644 8/2014
(Continued)

OTHER PUBLICATIONS

Swedish Search Report issued in Swedish Patent Application No. 1850456-3 dated Oct. 3, 2018.
(Continued)

*Primary Examiner* — Xiuyu Tai
(74) *Attorney, Agent, or Firm* — NIXON & VANDERHYE

(57) ABSTRACT

Disclosed is a method for surface treatment of an object, the method including the following steps: applying a surface layer on the object by electrodeposition of the object in a liquid bath; and forming the surface layer as a result of the bath containing at least an electrodeposition coating material and a conductive material. Furthermore, the method includes: providing the conductive material in the form of a carbon-based compound which is configured as a protective barrier covering generally the entire surface of the object. Also disclosed is an object including a surface layer which is applied in accordance with the above-mentioned method.

19 Claims, 2 Drawing Sheets

(51) Int. Cl.

| | |
|---|---|
| *C09D 5/44* | (2006.01) |
| *C09D 127/18* | (2006.01) |
| *C23C 2/06* | (2006.01) |
| *C23C 2/26* | (2006.01) |
| *C23C 28/00* | (2006.01) |
| *C23F 17/00* | (2006.01) |
| *C25F 1/00* | (2006.01) |

(52) U.S. Cl.
  CPC .............. *C09D 127/18* (2013.01); *C23C 2/06* (2013.01); *C23C 2/26* (2013.01); *C23C 28/343* (2013.01); *C23F 17/00* (2013.01); *C25F 1/00* (2013.01)

(58) Field of Classification Search
  CPC .......... C09D 127/18; C09D 7/61; C23C 2/06; C23C 2/26; C23C 28/343; C23C 30/00; C23C 2/02; C23C 2/024; C23C 2/0224; C23C 2/40; C23C 2/261; C23C 2/28; C23C 2/12; C23C 30/005; C23C 2/04; C23C 2/0222; C23F 17/00; C25F 1/00; H01M 10/0525; H01M 4/1391; H01M 10/052; H01M 4/13; H01M 4/622; H01M 4/625; H01M 4/0457; H01M 4/139; H01M 4/0404; H01M 4/131; H01M 4/1397; H01M 4/136; C08K 2003/2203; C08K 3/042; C08K 3/22; C08L 1/006; Y01E 60/10; C22C 38/00; C22C 38/14; C22C 38/38; C22C 38/02; C22C 38/06; C22C 38/12; C22C 38/002; C22C 38/04; C22C 38/28; C22C 38/32; C22C 38/34; C22C 38/26; C22C 38/22; C21D 1/26; C21D 1/74; C21D 1/76; C21D 6/008; C21D 9/46; C21D 6/005; B32B 15/04; B32B 15/043; B32B 15/012; B32B 15/013; B32B 15/18; Y10T 428/12993; Y10T 428/12979; Y10T 428/12799; Y10T 428/12972; Y10T 428/12792; Y10T 428/12757; Y10T 428/1295
  See application file for complete search history.

(56) References Cited

U.S. PATENT DOCUMENTS

| | | | |
|---|---|---|---|
| 5,476,580 | A | 12/1995 | Thorn et al. |
| 5,853,557 | A | 12/1998 | Souza et al. |
| 2010/0167071 | A1 | 7/2010 | Chouai et al. |
| 2014/0299475 | A1 | 10/2014 | Bullington et al. |
| 2015/0017447 | A1 | 1/2015 | Moravek et al. |
| 2015/0357079 | A1 | 12/2015 | Daughenbaugh et al. |
| 2016/0380255 | A1 | 12/2016 | Daughenbaugh et al. |
| 2017/0037257 | A1* | 2/2017 | Yang ................... C09D 5/1618 |
| 2017/0088969 | A1 | 3/2017 | Wysocki et al. |
| 2017/0137923 | A1* | 5/2017 | Chida .................... C23C 30/00 |
| 2017/0170515 | A1 | 6/2017 | Yushin et al. |
| 2021/0115585 | A1 | 4/2021 | Skalsky |

FOREIGN PATENT DOCUMENTS

| | | |
|---|---|---|
| CN | 104593847 A | 5/2015 |
| CN | 105986302 A | 10/2016 |
| EP | 2 483 359 B1 | 7/2016 |
| EP | 3781730 | 2/2021 |
| WO | 91/08266 A1 | 6/1991 |
| WO | 2006/110756 | 10/2006 |
| WO | 2008/029722 A1 | 3/2008 |
| WO | 2012/162359 A2 | 11/2012 |
| WO | 2019/126498 A1 | 6/2019 |
| WO | 2019203709 A1 | 10/2019 |

OTHER PUBLICATIONS

Office Action issued in Swedish Patent Application No. 1850456-3 dated Oct. 3, 2018.

Office Action issued in Swedish Patent Application No. 1850456-3 dated Jan. 30, 2020.

Office Action issued in Swedish Patent Application No. 1850456-3 dated May 28, 2021.

International Search Report for PCT/SE2019/050224 dated May 16, 2019, 5 pages.

Written Opinion of the ISA for PCT/SE2019/050224 dated May 16, 2019, 7 pages.

International Preliminary Report on Patentability for PCT/SE2019/050224 dated May 22, 2020, 14 pages.

Extended European Search Report issued in European Patent Application No. 19787628.7 dated Dec. 20, 2021.

Office Action, issued in Canadian Patent Application No. 3096581 dated Jan. 13, 2026.

\* cited by examiner

FIG. 2

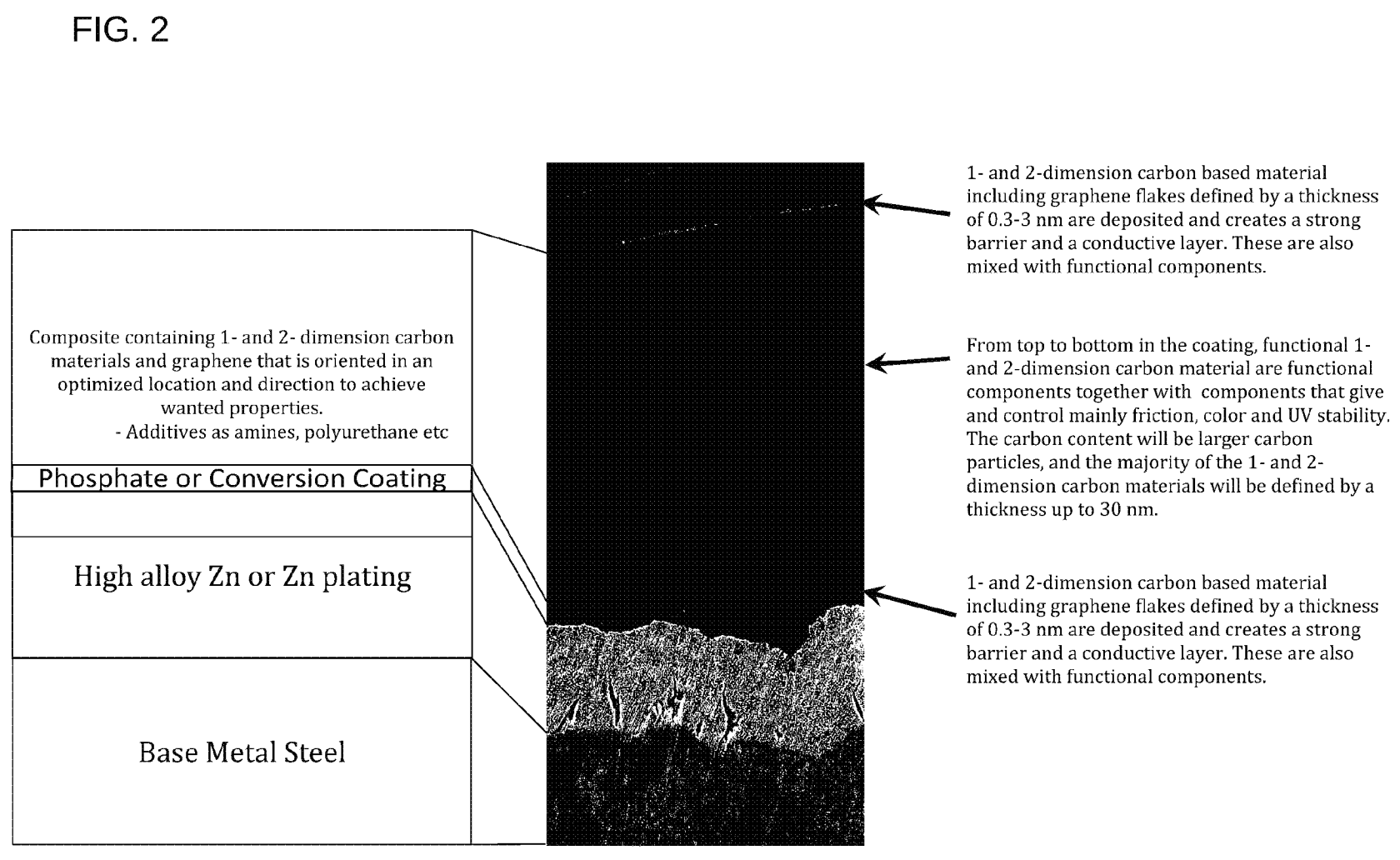

1- and 2-dimension carbon based material including graphene flakes defined by a thickness of 0.3-3 nm are deposited and creates a strong barrier and a conductive layer. These are also mixed with functional components.

From top to bottom in the coating, functional 1- and 2-dimension carbon material are functional components together with components that give and control mainly friction, color and UV stability. The carbon content will be larger carbon particles, and the majority of the 1- and 2-dimension carbon materials will be defined by a thickness up to 30 nm.

1- and 2-dimension carbon based material including graphene flakes defined by a thickness of 0.3-3 nm are deposited and creates a strong barrier and a conductive layer. These are also mixed with functional components.

Composite containing 1- and 2- dimension carbon materials and graphene that is oriented in an optimized location and direction to achieve wanted properties.
- Additives as amines, polyurethane etc Phosphate or Conversion Coating High alloy Zn or Zn plating Base Metal Steel

METHOD FOR SURFACE TREATMENT

CROSS-REFERENCE TO RELATED APPLICATIONS

This application is the U.S. national phase of International Application No. PCT/SE2019/050224 filed Mar. 13, 2019 which designated the U.S. and claims priority to SE 1850456-3 filed Apr. 19, 2018, the entire contents of each of which are hereby incorporated by reference.

TECHNICAL FIELD

The disclosure also relates to a method for surface treatment of an object, said method comprising the following steps: applying a surface layer on said object by electrodeposition of said object in a liquid bath and forming said surface layer as a result of said bath containing at least an electrodeposition coating material and a conductive material.

The disclosure also relates to an object comprising a surface layer which is applied in accordance with the method as mentioned above.

BACKGROUND

Objects made of metal are often exposed to conditions which may cause corrosion. An example of corrosion is when rust, i.e. iron oxides, is formed on the surface of a metallic object. Corrosion may occur when the metallic object is exposed to the weather, to electrical current, salt water, pollution or other hostile environments. Corrosion of different types may cause deterioration or damage to the surface of a metallic object, which is obviously a disadvantage within different fields of technology.

According to known technology, various treatments are used to reduce damage to metallic objects caused by corrosion. For example, as regards different vehicles such as cars and trucks—which are normally exposed to rain and other conditions which may cause corrosion—there is provided different types of surface treatment for different vehicle components so that the risk for corrosion can be minimized.

Today, there exist a number of known methods which are arranged so as to protect metallic objects from corrosion. For example, objects may be subject to a galvanizing process, which is a process in which a protective zinc coating is applied to a metallic object. A suitable type of galvanizing is the so-called hot-dip galvanizing process, in which the object in question is immersed in a bath of molten zinc. In this manner, the object is provided with a protective surface layer which decreases corrosion.

Other types of surface treatments are also previously known for providing protection against corrosion. However, there is a need for methods which can be used for an improved surface treatment of an object, in which a surface layer is applied on the object by means of an electrodeposition process and wherein not only a corrosion protection is obtained but in which certain properties of the object, such as its conductivity and friction, can be improved as compared with today's technology.

In particular, there is a need within the vehicle industry to provide an improved surface treatment for vehicle components, so that for example painted vehicle components can be made more durable by providing a surface layer having a high level of protection and strength.

SUMMARY

The present disclosure is based on the insight that the protection of the surface of an object can be improved by applying an electrodeposited surface layer on the object. Furthermore, there may be a demand for a relatively high electrical conductivity of the surface layer, and for a high mechanical and chemical strength, in particular in cases in which the object is in the form of a component for the vehicle industry. Also, there is a demand for a process for applying a surface layer which is reproducible and which leads to predictable results.

In accordance with the invention, the above-mentioned objects can be obtained by means of a method for surface treatment of an object, said method comprising the following steps: applying a surface layer on said object by electrodeposition of said object in a liquid bath; and forming said surface layer as a result of said bath containing at least an electrodeposition coating material and a conductive material. The method further comprises a step of providing said conductive material in the form of a carbon-based compound which is configured as a protective barrier covering generally the entire surface of the object.

By means of the invention, certain advantages are provided. For example, an effective surface protection with both corrosion protection and a suitable electrical conductivity, both bulk conductivity and surface conductivity, can be obtained by means of a stable and reproducible process. The method according to the invention is particularly suitable for vehicle components, for which there is currently a demand for components with a conductive and also protective surface layer. Firstly, it is necessary to secure an electrical grounding to an object without needing to penetrate the coating to get a suitable bulk conductivity, and secondly, it is necessary to protect an object and its coating by providing a suitable surface conductivity which will serve as an electrical discharge protection. In particular, the method will result in a process which provides a protective surface layer having a high mechanical, chemical strength and also unique electrical properties.

In particular, the invention can be used to obtain surface protection having a high electrical conductivity in order to ensure a correct earth connection with the substrate material with a low resistance and impedance. This makes it also possible to avoid an uneven matching of the bulk conductivity between different objects, for example in a vehicle, which are in contact with each other. The method also provides protection against deterioration due, for example, to a high-voltage electric discharge on the absolute outer surface of the surface treatment of the component in question, i.e. due to a high surface conductivity. Consequently, the invention is an improvement as compared to prior art both as regards the bulk conductivity and the surface conductivity related to electrical discharge protection.

The present disclosure is based on the principle that a protective barrier for covering a surface of an object is provided. According to an embodiment, the method comprises a step of providing said carbon-based compound in the form of carbon-based material, 1 and 2-dimensional carbon and graphene oxide. An embodiment in which the carbon-based compound is constituted by graphene oxide which is added to the bath will be described below. However, other materials, so called 1- and 2-dimension materials, can also be used.

By means of the protective surface layer according to the disclosure, improvements related to scratch and abrasion resistance can be obtained, and also increased hardness and mechanical resistance. Furthermore, there is provided improved protection against corrosion and improved properties related to friction and wear and also improved thermal and electrical properties.

According to an embodiment, the method comprises a step providing said carbon-based compound in the form of graphite, graphene or graphene oxide, or a combination of at least two of said compounds.

According to an embodiment, the method comprises a step of providing a carbon-based compound in the form of graphene having a thickness in the interval of 0.3-3 nm and consisting of 1-10 atom layers.

According to an embodiment, a certain amount of a 2-dimension carbon-based compound is added to the bath. Furthermore, 2-dimension carbon particles are deposited on the object so as to form the protective barrier.

According to a further embodiment, the method comprises a step of providing a carbon-based 1- or 2-dimensional material having a thickness in the interval of 0.3-30 nm and consisting of 1-100 atom layers.

It is known that graphene and other crystalline 2D material are configured so that they have a thickness of a few atoms (typically not more than 10 layers of atoms). In the context of the present disclosure, the materials which can be used for the protective barrier are based on graphene flakes having a thickness of 0.3-3 nm, i.e. corresponding to a thickness of 1-10 atom layers, and also further materials in the form of carbon-based compounds which are based on 1- and 2-dimension materials with a thickness which is approximately 0.3-30 nm and having a thickness of 1-100 atom layers, which means that each flake may vary as regards the number of atom layers.

In this disclosure, an example involving graphene oxide as a starting material is described below in order to explain the principles of the invention. However, other 1- and 2-dimension materials with properties similar to graphene can be used in the process.

According to an embodiment, the method further comprises providing a conductive carrier in said bath as a carrier for said carbon-based compound so as to be deposited on the surface of said object.

According to a further embodiment, the method comprises a step of providing a conductive carrier in the form of conductive carbon.

Suitable carbon-based materials are of a thickness ranging from 0.3 nm and up to conductive carbon particles having a size which is approximately 4 μm. The magnitude and properties of the conductive carbon particles are preferably determined based on the electrical requirements. The type of conductive carbon is generally chosen based on the particle structure of the conductive carbon particles and also the requirements regarding the layer thickness and the concentration of the conductive carbon.

According to an embodiment, the method further comprises a step of providing said electrodeposition material in the form of an electrodeposition paint or lacquer layer.

According to a further embodiment, the method comprises a step in which an additional layer of a carbon-based compound, being configured as a protective barrier covering the paint or lacquer layer, is provided.

According to an embodiment, the method further comprises a step of providing a concentration of said conductive material which corresponds to a predetermined conductivity of said protective barrier.

According to a further embodiment, the method comprises a step of applying a voltage of 40-200 V while applying a direct current over said object and a further electrode.

According to an embodiment, the method further comprises a step of applying said surface layer at a temperature which is within the interval of 15-30 degrees centigrade.

According to a further embodiment, the method comprises a step of providing PTFE, polytetrafluorethylene, in said bath.

According to an embodiment, the method further comprises a step of providing PTFE with a concentration which corresponds to a coefficient of friction of said surface layer which is in the interval 0.08-0.25.

According to a further embodiment, the method comprises a process of depositing a layer for corrosion protection of said object, before forming said surface layer.

According to an embodiment, the method further comprises a step of depositing said layer for corrosion protection in the form of a zinc-based surface layer provided by a hot-dip galvanizing process, in which the object in question is immersed in a bath of molten zinc.

In accordance with the invention, the above-mentioned requirements can also be obtained by an object comprising a surface layer which is applied in accordance with a method as defined above.

Further advantages and advantageous features of the disclosure are disclosed in the following description and in the dependent claims.

BRIEF DESCRIPTION OF THE DRAWING

Further objects, features, and advantages of the present disclosure will appear from the following detailed description, wherein certain aspects of the disclosure will be described in more detail with reference to the accompanying drawings wherein:

FIG. 2 shows a further side view of a surface structure formed in accordance with an embodiment of the present disclosure.

DESCRIPTION OF EMBODIMENTS

Figure 1:
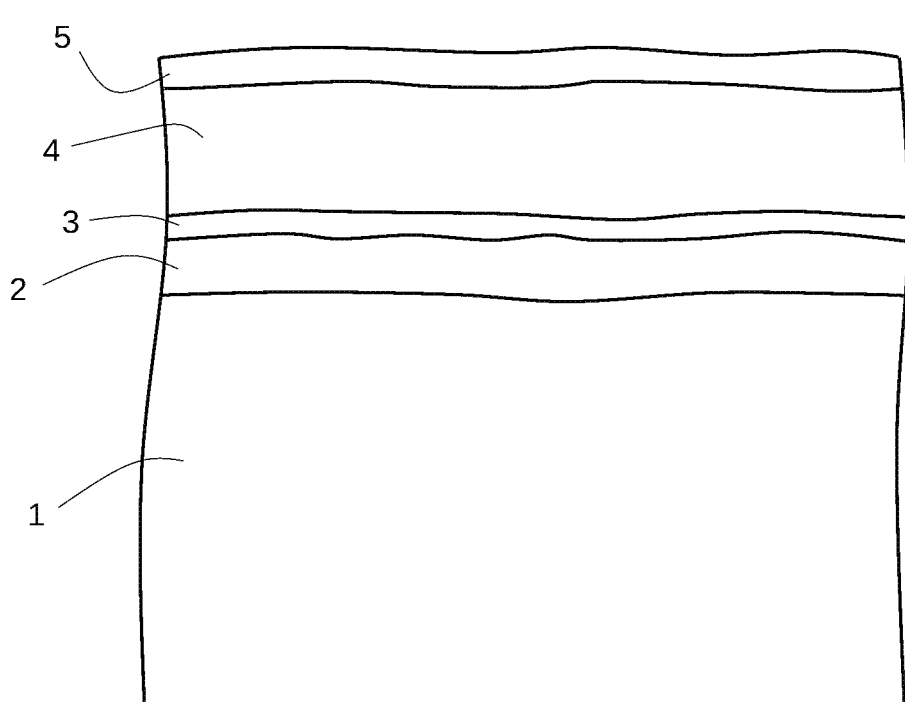
FIG. 1 shows a simplified side view of a surface layer which is obtained in accordance with an embodiment of the present disclosure.

Different aspects of the present disclosure will be described more fully hereinafter. The embodiments disclosed herein can be realized in many different forms and should not be construed as being limited to the aspects set forth below.

The disclosure is based on a general principle for surface treatment of objects by means of electrodeposition, which is a well-known method which is based on the principle that particles having opposite charge are attracted to each other. This principle is used in an electrodeposition process by immersing an object (i.e. the object which shall be provided with a surface layer) in a bath with an electrolyte which contains electrodeposition particles. If the object is electrically conductive, an electric field can be generated in order to give the particles an electric charge so that they form a surface layer on the object. The electrodeposition process is particularly suitable to be used with electrodeposition particles such as polymers and dyes and can be arranged for applying such particles to the surface of a particular object. In this manner, a suitable colour and a protective surface coating with a particular thickness can be provided on the object. In this manner, protection against corrosion can be provided.

In certain applications, in particular within the vehicle industry, there is a need for efficient surface treatment of an object by means of an electrically conductive surface layer. In particular, objects in the form of, for example, electric wires and battery poles need to be formed with a relatively high electrical conductivity while they also need efficient surface treatment for protecting their surface. Normally, surface protection with a high electrical conductivity is necessary to obtain for example for an earth connection, i.e. where it is relevant with the electrical bulk conductivity both for electrical functions in the car but also to decrease or eliminate galvanic corrosion induction and also to ensure an electrical discharge function through a surface conductivity with a low resistance.

For example, the surface treatment according to the disclosure is particularly suitable for different types of fastening elements for vehicles such as earth bolts. This is particularly due to requirements to provide a unified electric potential throughout the entire vehicle. This is increasingly necessary since today's vehicles are equipped with more electric equipment having different electric potential.

The method according to this disclosure is also suitable for painted vehicle components, in order to provide a protective barrier layer which provides a high level of mechanical and chemical protection against damage to painted surfaces. The barrier layer is also conductive and can be used as protection against damages due to high-level electrical discharge on the surface of the component in question, but also by eliminating or reducing electrical potential differences that are always inducing galvanic corrosion.

A further advantage according to the disclosure is that an improved protection against corrosion for vehicle components leads to a longer lifetime for the vehicles in question. This is obviously also positive from an environment point of view.

For this reason, and according to the present disclosure, there is provided a method which comprises a step of applying a surface layer on an object by electrodeposition of said object in a liquid bath. Due to the fact that the bath contains an electrodeposition coating material and also a conductive material, a protective surface layer can be formed on the object. The provision of a conductive material is based on the above-mentioned requirement to provide a surface layer on objects which are intended to have a highly conductive surface layer. To this end, the above-mentioned conductive material is provided in the form of a carbon-based compound which is arranged as a protective layer which covers the surface of the object. In this manner, a well-defined conductivity of the object can be obtained.

Furthermore, according to an embodiment, the conductive material is provided in the form of graphite, graphene or graphene oxide, or a combination of two or more of the above-mentioned compounds. The invention is not limited to the use of any particular one of said materials, or any particular combination of said materials. The selection of conductive material can be made by choosing one or more of said materials depending on the object which is to be treated and depending on other process parameters.

The present method for applying a surface layer on an object is configured so that the surface layer constitutes to a protective barrier layer which covers generally the entire surface of the object and is configured for protecting the object against mechanical and chemical impact, and also for having a well-defined conductivity. The barrier layer is deposited by means of an electrodeposition process involving a bath which—as mentioned above—comprises an electrodeposition coating material, suitably a polymer material, and also a suitable conductive material, as will be described in greater detail below.

According to an embodiment, the conductive material used in in the form of graphene. However, alternative materials can be used. Graphene and other crystalline 2D material are configured so that they have a thickness of a few atoms, typically 1-10 layers of atoms. However, variations of such material—i.e. strictly not "graphene" in a literal sense but slightly imperfect variations which may have more than 10 layers of atoms—may also be used. Such variations may occur naturally in manufactured graphene material. In the context of the present disclosure, the protective barrier can be built up by "pure" graphene flakes with a thickness of 0.3-3 nm, i.e. corresponding to a thickness of 1-10 atom layers, and also by other materials in the form of carbon-based compounds which are based on 1- and 2-dimension materials with a thickness which is approximately 0.3-30 nm and having a thickness of 1-100 atom layers, i.e. slightly "impure" graphene-like materials, in which each flake may vary as regards the number of atom layers and may also exceed 10 atom layers in number.

According to an embodiment, a liquid bath is provided to which there is added graphene oxide, suitably in the form of carbon-based flakes. Furthermore, a polymer material, in the form of polymer particles, is added to the bath in order to form an isolating lacquer layer during the electrodeposition process. Also, the object itself is also immersed into the bath.

According to an embodiment, the bath comprises 1- and 2-dimensional carbon material including graphene oxide, PTFE (polytetraflourethylene) particles and PU particles, carbon black, $SiO_2$, amino acids, water and a very low concentration of a volatile organic compound. Variations of the contents of the bath are possible within the scope of this disclosure.

The concentration of the carbon-based compound is preferably in the magnitude 1-30 ppm. The concentration is not limited to such an interval only, and can generally be adapted for example to provide a desired conductivity of the finished surface layer. According to an embodiment, the conductivity is controlled so as to be in the magnitude of less than <100 Ohms, at a voltage which is higher than 16V, as defined according to the definition of the bulk conductivity.

Furthermore, the process is suitably an anodic process, i.e. a process in which negatively charged material is deposited on an anode, which consequently constitutes a further electrode which is positively charged.

A direct current is applied over the object and the further electrode which is also immersed in the bath. According to an embodiment, the process is carried out with an operating voltage which is within the interval 40-200 V and with a temperature which is within the interval 15-30 degrees centigrade. These parameters are chosen so as to obtain an even build-up of a surface layer on the object, as will be described in greater detail below.

In order to initiate the process according to the invention, certain conductive particles must be added to the bath. Such conductive particles act as conductive carriers in order to allow the carbon-based compound to attach to the surface layer of the object, so as to form the above-mentioned protective barrier.

Furthermore, the electrodeposition coating material, suitably a polymer material, is also added to the bath in a suitable amount.

When the process is initiated and the direct current is applied, an electrophoresis process will be initiated in the bath which will release oxygen and will also exert an attractive force on the charged carbon-based particles. This means that the graphene oxide will be attached to any conductive particle (i.e. suitably in the form of conductive carbon) in the bath. Due to the fact that a voltage is applied over the electrode and the object, conductive particles with attached charged carbon-based particles will be transported towards the object as a result of the electrodeposition process.

The conductive particles in the bath carrying the attached charged carbon-based particles will eventually reach the object. The charged carbon-based particles are relatively loosely attached to its oxygen, which means that they will easily travel to the object. Also, oxygen will be released from the carbon-based particles, suitably through a reduction process. This means that the carbon-based particles will be attached to the object in the form of 1- and 2-dimensional carbon material flakes of which graphene may be one of the materials.

It has been found that the carbon-based particles will be oriented in a manner which is generally parallel with respect to the surface of the object. More precisely, the graphene flakes will be arranged as a covering and protective barrier layer. Simultaneously, oxygen is released from the carbon-based compound. The carrier in the electrolyte carries the most part of the oxygen atoms of the carbon-based compound so that it loses the charge and is consequently attached in a parallel manner with reference to the substrate, as described above.

The method according to the disclosure is based on the principle that a "carrier" compound, i.e. suitably in the form of conductive particles which according to an embodiment is in the form of conductive carbon, can be used for transporting the above-mentioned carbon-based particles to the surface of the object as described above. According to further embodiment, the carrier compound can also be constituted by aluminium oxide or titanium oxide.

According to an embodiment, the carbon-based particles are of a size having a width which is less than approximately 1 µm and a thickness which is of the magnitude 0.3-30 nm, i.e. corresponding to 1-100 atom layers. The preferred thickness is 0.3-3 nm, i.e. corresponding to 1-10 atom layers. Also, the concentration of graphene oxide particles in the bath is suitably approximately 30 mg per liter.

FIG. 1 is a simplified cross-sectional view of an object 1 which is treated in accordance with the present method. The object 1 is manufactured from a suitable metal or alloy, such as steel. As explained above, the object 1 can optionally be treated with a corrosion treatment method, which in such case is an initial process which results in a first layer 2 which is arranged for corrosion protection. Such a corrosion protection can suitably be based on zinc or zinc-alloy plating of the surface of the object 1. It should be noted that this first layer 2 is optional, i.e. the present method for providing a protective barrier can be carried out with or without the corrosion protection layer 2.

Furthermore, the method is according to an embodiment configured for creating a layer 3 of graphene flakes, i.e. consisting of graphene. As described above, the graphene oxide has been carried to the object 1 by first being attached to the conductive particles and then releasing its oxygen atoms, after which the graphene particles are arranged in the form of flakes in a configuration in which the flakes are generally parallel to the surface of the object 1. In this manner, the protective layer 3 is formed.

The carbon-based particles releases its oxygen according to the principles of electrophoresis, i.e. the carbon-based particles are reduced so as to release oxygen.

The graphene layer 3 is electrically conductive and forms a strong barrier. This will contribute to a deposition of polymer particles in the bath in the form of a polymer layer 4, i.e. a majority of the conductive functional layer of lacquer or paint, on top of the graphene layer 3, as shown in FIG. 1. This layer is formed in a manner which starts with an electrolytic process and is followed by an electrophoresis process.

The layer 4 is formed by a functional component which may be used for properties such as friction, colorization and UV stability of the surface of the object 1. The carbon content will be in the form of round and larger carbon particles, and the majority of the 2D materials is dominated by particles which are defined by a thickness of up to 30 nm. Such particles are suitably in the form of graphene and added particles such a conductive carbon black.

Furthermore, the electrodeposition material which should be used in the method according to the disclosure is, according to an embodiment, in the form of an electrodeposition paint or lacquer. According to an example, the electrodeposition coating material is suitably polyurethane, but other materials can also be used within the scope of the invention in order to contribute to the surface layer arranged on the object 1.

After the polymer layer 4 has been deposited on top of the layer 3 of the carbon-based compound, the process in which a deposition of further carbon-based particles is started again due to an electrophoresis process. This process forms a further layer 5, preferably of graphene. However, other materials are also possible, as discussed above. The further layer 5 is formed due to the fact that when the current efficiency is gradually reduced (due to isolation in the layer), the oxygen release is initiated at the object 1, i.e. the cathode, which means that further deposition of 2-dimensional carbon particles will be initiated.

According to an embodiment, the method according to the disclosure comprises a step of applying the surface layer when the bath comprising the coating material and the conductive material has a temperature which is within the interval of 15-40 degrees centigrade. Such a choice of temperature will cause the surface layer to be formed in an optimal manner. According to a particular embodiment, the method is carried out at a temperature which is approximately 22 degrees centigrade.

Depending on the heat generation during the electrodeposition process, it may optionally be suitable to provide a cooling device in order to prevent the temperature of the bath to exceed a highest allowed temperature.

According to an embodiment, the surface layer, i.e. at least the layer 3 of a carbon-based compound and a polymer layer 4, is applied while feeding a current during the electrodeposition process, said current being chosen to correspond to a surface layer of suitable thickness. According to an embodiment, the surface layer has a thickness which is approximately 8 microns. However, the thickness may vary between approximately 5-60 microns depending on which object is subject to the surface treatment Furthermore, the current density is inversely proportional to said temperature. This means that a specific increase in temperature leads to a corresponding decrease in current density, and vice versa.

According to an embodiment, the electrodeposition process is carried out by applying a voltage which is in the interval between 40-200 V during a time period which is within the interval between 40-360 seconds. This means that the object is electrically conductive (or alternatively, will be surface treated so as to become electrically conductive) in a process in which a surface layer is deposited between a regular anode and cathode.

In this regard, it should be noted that the invention can be implemented both with anodic and cathodic processes.

The applied voltage and current density are chosen so that a predetermined surface layer is deposited on the object, as described above, while providing a certain conductivity for the layer. Also, the electrodeposition coating material, which also forms part of the surface layer, will give the object a certain color.

It can be noted that a reduction of corrosion and a suitable conductivity can be obtained by using for example graphene or graphite in the protective surface layer, in combination with a suitable electrodeposition coating layer such as polyurethane.

In summary, and according to an embodiment, a certain amount of a 2-dimension carbon-based compound is added to the bath in a suitable concentration. Also, 2-dimension carbon particles are deposited on the object so as to form the above-mentioned protective barrier. One example of a 2-dimension carbon-based compound to be added to the bath is graphene oxide, and one example of a 2-dimension type of carbon particles to be deposited for forming of the protective barrier is graphene. However, the disclosure is not limited to these compounds only.

Regarding the conductive carrier, it should be noted that suitable carbon-based materials are of a magnitude ranging from 0.3 nm (thickness) and up to a magnitude of approximately 4 μm. The magnitude and properties of the conductive carbon particles are preferably determined based on electrical requirements. Conductive carbon is generally provided in the form of specific structures of conductive carbon particles and also based on the layer thickness and the concentration of the conductive carbon. According to an embodiment, a suitable concentration of conductive carbon is suitably approximately 0.1-1% of the bath volume. The concentration of the material is suitably adapted to the total thickness of the surface layer and to the required conductivity.

Purely as examples, it could be noted that various types of objects may undergo the process according to the invention. A first type of objects, such as regular screws and similar fastening elements, can be provided with a surface layer defining an impedance of approximately 4 ohms. A second type of objects, such as earth screws and similar elements, can be provided with a surface layer defining an impedance of approximately 7 ohms. Also, a third type of objects are conductors having a conductivity in the range of nickel and silver. The range of conductivity depends on for example on the size, geometry and quality of the objects in question.

Two examples of surface treatment in accordance with the invention will now be described. In a first example, a line of relatively large objects are dipped sequentially in the bath which is described above. Such objects may typically be of a size with a length which is approximately 20 cm or longer and a weight of approximately 300 grams or more. In such an embodiment, it is suitable with a voltage which is within the interval of 40-150 V which is applied during a time period within the interval of 40-80 seconds, with a current density of approximately 15 A/m$^2$ and with a bath temperature which is within the interval of 20-25 degrees centigrade. Such a process will result in a surface layer having suitable properties as regards corrosion resistance and conductivity for objects of a specified, relatively large, size.

According to a further embodiment, which is suitable for smaller objects, i.e. objects which are typically of a length which is less than approximately 20 cm and having a weight less than approximately 300 grams, the process for surface treatment is suitably carried out by placing the objects in a barrel which is rotated in the bath. In such an embodiment, it is suitable with a voltage which is within the interval of 80-140 V which is applied during a time period within the interval of 60-360 seconds, and with a bath temperature which is within the interval of 20-25 degrees centigrade. Such a process will result in a surface layer having suitable properties as regards corrosion resistance and conductivity for objects of a specified, relatively small, size.

It should be noted that the invention is not limited to any particular combination of process parameters (for example the voltage, time period, current density or temperature). These parameters can consequently be chosen independently of each other.

In addition to the above-mentioned requirements regarding a relatively high conductivity, in particular for objects in the field of vehicle technology, there is often also requirements for a certain predetermined friction of the surface layer of the object. For this reason, the method according to this disclosure may optionally include a step of providing a certain amount of PTFE (polytetraflourethylene) in the bath.

According to an embodiment, PTFE is provided with a concentration which corresponds to a required coefficient of friction of said surface layer. In other words, the amount of PTFE used in the surface treatment process will determine the coefficient of friction of the final surface layer. This means that the surface friction of the object can be adapted to the type of object which is treated. Also, in this case, the provision of PTFE for determining the surface friction is suitable to be used for components within the vehicle industry.

The invention is particularly suitable for components wherein there is a need for a predetermined friction coefficient. For example, the invention is suitable for many types of fastening elements. In the case of a screw or bolt, the correct friction coefficient can be achieved with smaller dimensions—i.e. with lighter fastening elements—than previously used, i.e. which consequently means lighter vehicles, while maintaining the strength of the fastening element and the bond.

According to a particular embodiment, it is suitable that the method comprises a step in which PTFE is provided with a concentration which corresponds to a coefficient of friction of the object's surface layer which is in the interval 0.08-0.25. Such properties are suitable for objects such as for example wheel bolts for vehicles and similar objects. The friction wanted in the interval is influenced by the following parameters are to be changed in process—reference test material in friction test, current, temperature, PTFE concentration, other additives concentration etc.

According to an embodiment, the coefficient of friction is suitably within an interval which is approximately 0.13-0.19. Such an interval can be accomplished with the present method for surface treatment wherein the concentration of PTFE corresponds to approximately 20-40 grams/liter, preferably approximately 32 grams/liter, of the bath in which the object is immersed (assuming a temperature of approximately 22 degrees, a voltage of approximately 40-150 V and a current density of approximately 15 A/m$^2$). In this manner, the method according to this disclosure can be used to provide a desired coefficient of friction in a manner which is controllable and predictable and also which is independent of the material of the object to be treated.

In addition to the above-mentioned requirement for a certain conductivity of the surface layer, and the optional requirement of providing a particular surface friction of the object, there may also be a requirement to obtain an improved corrosion protection of the object in question. For this reason, and according to an embodiment, the disclosure also relates to a process of depositing a layer for corrosion protection of said object, which according to the embodiment is carried out before applying said surface coating.

According to an embodiment, the method according to this disclosure comprises a step of depositing a corrosion protection layer in the form of a zinc-based surface layer provided by a hot-dip galvanizing process, in which the object in question is immersed in a bath of molten zinc.

According to a further embodiment, the corrosion protection layer is deposited by means of galvanic deposition of a surface layer comprising zinc, iron and manganese by means of an electrolyte containing the following compounds: zinc ions with a concentration of 4-60 grams/litre; iron ions with a concentration of 0.5-30 grams/litre; and manganese ions with a concentration of 0.1-15 grams/litre. Such a particular combination has been found to give particularly advantageous properties as regards corrosion protection.

The invention can be used with other corrosion protection processes. According to a further embodiment, the surface treatment according may involve a corrosion treatment of the zinc flake type, which is known as such. Such coatings provide good protection against corrosion. Also, zinc and aluminum flakes may be bonded together for corrosion protection. Furthermore, different electroplated coatings with zinc or zinc/iron alloys can also be used. Generally, the method according to the disclosure could be combined with all existing metallic material and all conductive pre-treatments and conductive anti-corrosion treatments.

Generally, a process for surface treatment of an object according to an embodiment will follow a specified sequence of method steps, i.e. according to the following:

Step 1: soak cleaning of the object

Step 2: electrolytic cleaning

Step 3: rinsing

Step 4: rinsing

Step 5: pickling

Step 6: rinsing

Step 7: rinsing

Step 8: electrolytic activation

Step 9: rinsing

Step 10: rinsing

Step 11: pickling activation

Step 12: rinsing

Step 13: rinsing

Step 14: corrosion protection of the object (in accordance with any one of the above-mentioned corrosion protection methods)

Step 15: rinsing

Step 16: rinsing

Step 17: rinsing

Step 18: convection layering (stabilizing in order to achieve a sufficient adherence of the surface layer)

Step 19: rinsing

Step 20: rinsing

Step 21: the method described above for surface treatment of an object by applying a surface layer on the object in question Step 22: ultrafiltration rinsing (i.e. filtering of dye particles in the bath for recycling purposes)

Step 23: ultrafiltration rinsing

Step 24: de-ionized water rinsing (i.e. rinsing with distilled water)

Step 25: treating object in an oven (for hardening, suitably at approximately 140 degrees centigrade)

As mentioned, the above-mentioned surface layer has a thickness which is approximately 8 microns. Also, the thickness may vary between approximately 5-60 microns depending on which is subject to the surface treatment. Also, if a separate corrosion protection layer has first been deposited on the object, such a layer for corrosion protection is preferably approximately 8 microns.

Also, an improved object comprising a protective surface layer can be obtained by means of the methods as described. According to an embodiment, the object will have an improved corrosion protection, an increased conductivity and a predetermined surface friction.

FIG. 2 is a side view of an object being subject to a method for surface treatment according to an embodiment of the disclosure and shows a cross-section through an object with a protective barrier layer. An object is covered with a plating which for example can be obtained by high alloy Zn or Zn plating. Furthermore, a phosphate or conversion coating is formed as an intermediate layer to improve adhesion. Furthermore, a layer with a high content of 2-dimensional graphene flakes is formed, generally as described above and having a thickness of approximately 0.3-3 nm. The next layer is a composite which is formed by a 2-dimensional carbon material with functional components, for example for a required friction and color. Finally, a further layer with a high content of 2-dimensional graphene flakes is formed, having a thickness of approximately 0.3-3 nm.

In summary, the disclosure relates to a method of surface treatment of an object 1 which provides a number of advantages. Firstly, as regards corrosion protection, the method gives an improved edge protection of the object and improved properties related to discharge and UV, as well as excellent barrier properties. Also, an improved wear resistance will be obtained. A further advantage is that the method requires no need for masking. Secondly, as regards electrical conductivity, the method leads to optimal properties related to the grounding and connecting electricity. Thirdly, the method leads to improved friction management, with a friction coefficient which is preferably within the interval 0.08-0.25.

The disclosure may be varied within the scope of the appended claims. For example, the process steps, materials and process parameters used for forming the surface layer may be varied, as indicated above.

The invention claimed is:

1. Method for surface treatment of an object (1), said method comprising the following steps:

applying a surface layer (3, 4) on said object (1) by electrodeposition of said object (1) in a liquid bath; and forming said surface layer (3, 4) as a result of said bath containing at least an electrodeposition coating material and a conductive material, wherein the method further comprises:

providing said conductive material in the form of a carbon-based compound selected from the group consisting of graphite, graphene, graphene oxide and combinations thereof; and depositing a layer of corrosion protection on said object, before forming said surface layer, wherein the surface layer (3, 4) comprises a composite containing 1- and 2-dimensional carbon materials with functional components, and wherein a further layer (5) is added after the surface layer (3, 4) has been deposited.

2. The method according to claim 1, further comprising:

providing said carbon-based compound in the form of graphene oxide.

3. The method according to claim 1, further comprising:
providing said carbon-based compound in the form of graphene having a thickness in the interval of 0.3-3 nm and consisting of 1-10 atom layers.

4. The method according to claim 1, further comprising: wherein the composite has a thickness in the interval of 0.3-30 nm and consisting of 1-100 atom layers.

5. The method according to claim 1, further comprising:
providing a conductive carrier in said bath as a carrier for said carbon-based compound so as to be deposited on the surface of said object (1).

6. The method according to claim 5, further comprising:
providing the conductive carrier in the form of conductive carbon.

7. The method according to claim 1, further comprising:
providing said electrodeposition material in the form of an electrodeposition paint or lacquer layer.

8. The method according to claim 7, further comprising:
providing an additional layer of carbon-based compound being configured as said further layer (5) covering the surface layer (3, 4) polymer layer (4).

9. The method according to claim 1, further comprising:
providing a concentration of said conductive material which corresponds to a predetermined conductivity of said surface layer (3, 4).

10. The method according to claim 1, further comprising:
applying a voltage of 40-200 V while applying a direct current over said object (1) and a further electrode.

11. The method according to claim 1, further comprising:
applying said surface layer at a temperature which is within the interval of 15-30 degrees centigrade.

12. The method according to claim 1, further comprising:
providing PTFE, polytetrafluorethylene, in said bath.

13. The method according to claim 12, further comprising:
providing the PTFE with a concentration which corresponds to a predetermined coefficient of friction of said surface layer.

14. The method according to claim 13, further comprising:
providing the PTFE with a concentration which corresponds to a coefficient of friction of said surface layer which is in the interval 0.08-0.25.

15. The method according to claim 1, further comprising:
depositing said layer (2) for corrosion protection in the form of a zinc-based surface layer provided by a hot-dip galvanizing process, in which the object (1) in question is immersed in a bath of molten zinc.

16. The method according to claim 2, further comprising:
providing said carbon-based compound in the form of graphene having a thickness in the interval of 0.3-3 nm and consisting of 1-10 atom layers.

17. The method according to claim 2, further comprising:
wherein the composite has a thickness in the interval of 0.3-30 nm and consisting of 1-100 atom layers.

18. The method according to claim 9, wherein said predetermined conductivity is less than <100 Ohms, at a voltage which is higher than 16V.

19. The method according to claim 1, further comprising:
applying a voltage of 40-200 V while applying a direct current over said object (1) and a further electrode; and
applying said surface layer at a temperature which is within the interval of 15-30 degrees centigrade.

* * * * *